April 19, 1960 P. VLAHOS 2,933,010
LIGHT BRIGHTNESS METER
Filed June 17, 1957 2 Sheets-Sheet 1
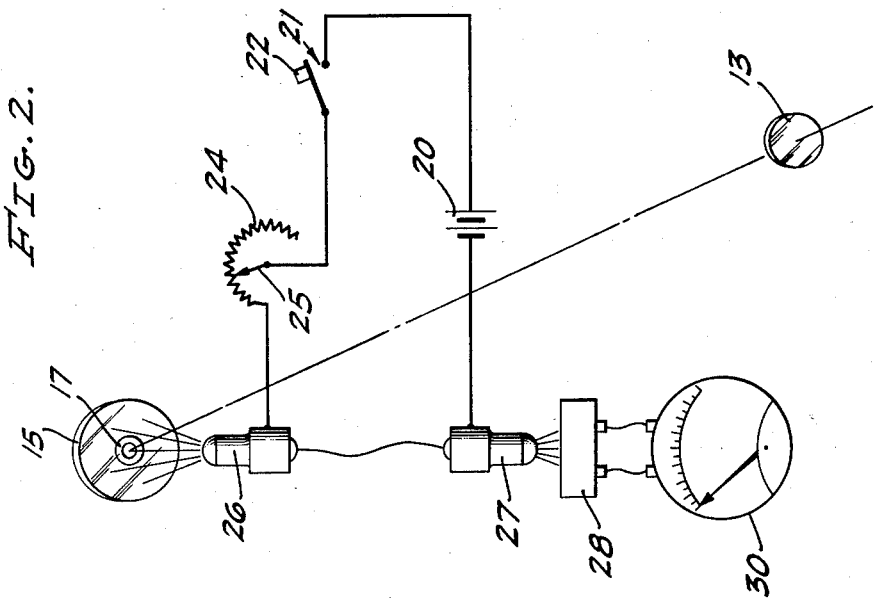
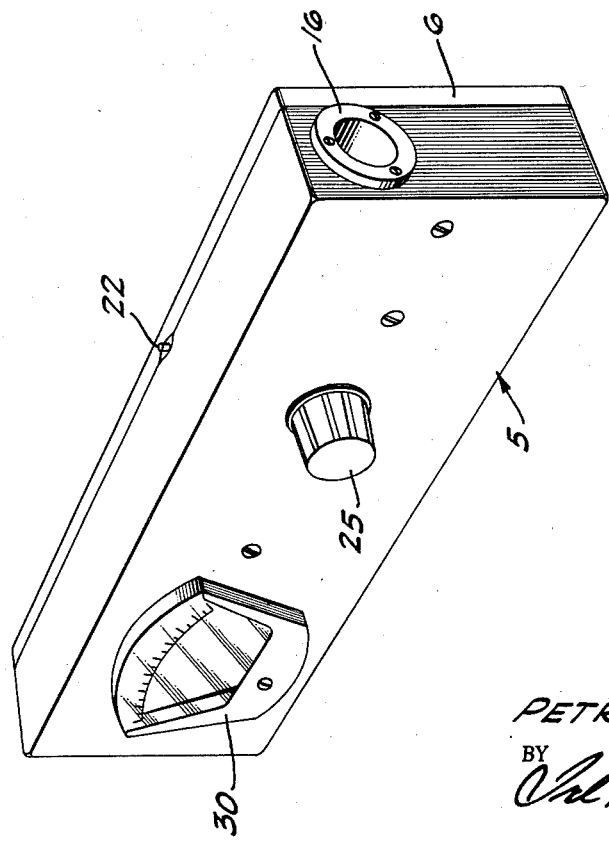
INVENTOR.
PETRO VLAHOS
BY
ATTORNEY.

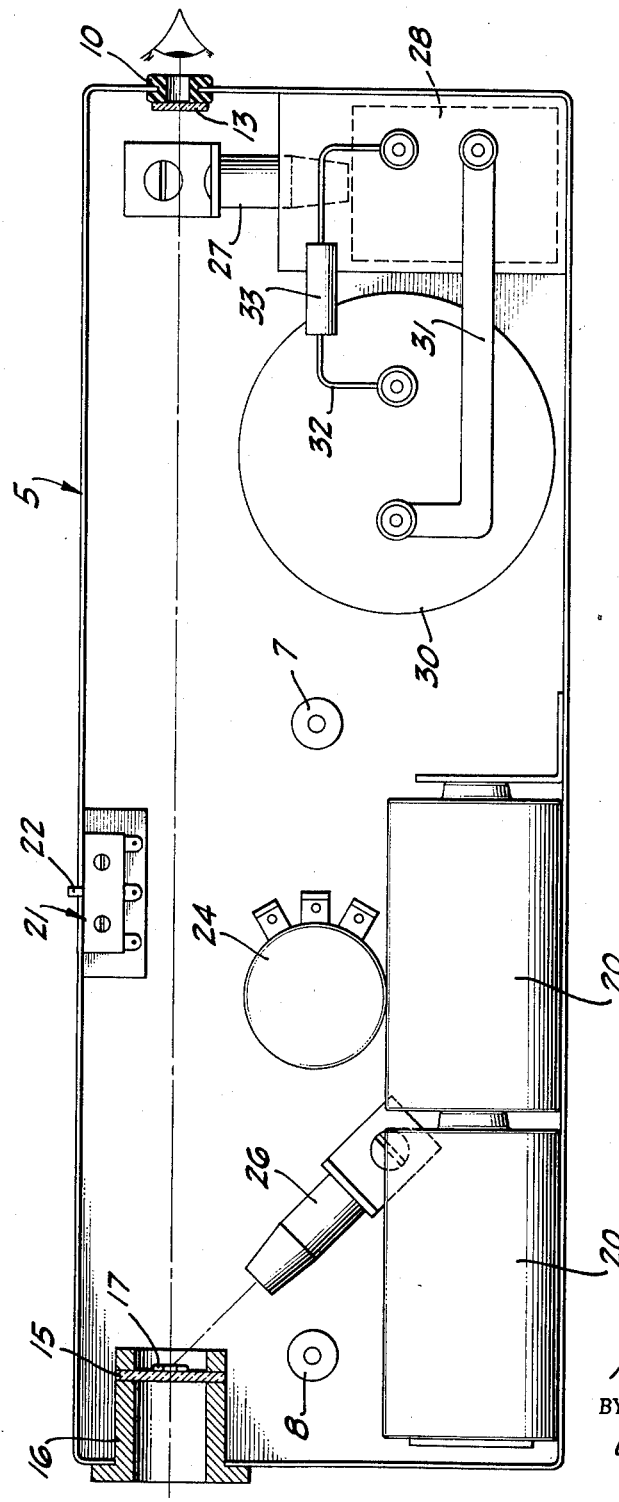

United States Patent Office 2,933,010
Patented Apr. 19, 1960

2,933,010

LIGHT BRIGHTNESS METER

Petro Vlahos, Los Angeles, Calif., assignor to Motion Picture Research Council, Inc., Los Angeles, Calif., a corporation of California Application June 17, 1957, Serial No. 666,035

4 Claims. (Cl. 88—23)

This invention relates to apparatus for measuring light intensities or for determining the brightness of objects, such as motion picture screens, either in comparative units or positive units, such as foot lamberts.

Meters, photometers and comparison light measuring systems are known, the present invention being of the latter type. It has several advantages over prior apparatus. The meter uses no balancing circuits, and, therefore, requires no balancing or zero adjustments, nor is a constant current or a reference current needed. Furthermore, the brightness match is obtained by the simple function of varying the current through a lamp so as to vary its light output. While this simple procedure would ordinarily be unworkable because of the resultant change of color temperature and, therefore, color of the comparison spot, a filter at the eyepiece permits obtaining visual balance, since it insures identical color between the comparison spot and the object whose brightness is being measured.

The brightness range of the instrument can be extended downwardly by inserting a neutral density filter directly over the lamp illuminating the comparison spot. This filter can provide multipliers of 0.1, 0 .01, etc. A neutral filter inserted over the entire viewing window, but not over the lamp illuminating the comparison spot, would provide multipliers of 10, 100, 1000, etc.

The principal object of the invention, therefore, is to facilitate the measurement of the brightness of objects.

Another object of the invention is to provide an improved light measuring or brightness meter.

A further object of the invention is to provide a light brightness determining meter which has no balancing circuits or adjustments, nor requires a constant current.

A still further object of the invention is to provide a brightness meter which does not vary in readings because of color differences and which provides a visual balance for all colors of an object whose brightness is being measured.

A better understanding of this invention may be had from the following detailed description when read in connection with the accompanying drawings, in which:

Fig. 1 is a perspective view of a brightness meter embodying the invention;

Fig. 2 is a diagrammatic view of the circuit embodied in the invention; and

Fig. 3 is a plan view of the interior of the light meter with the cover removed.

Referring, now, to the drawings in which the same reference numerals refer to the same elements, a casing 5 has a cover 6 which may be attached to the casing 5 in any suitable manner, such as by two screws in the holes of mounting posts 7 and 8 shown in Fig. 3. At the rear end of the casing 5 is an eyepiece 10 attached to the casing in any suitable manner, and over the inner surface of which is a filter 13, this filter being selected to pass a narrow band or portion of the visible spectrum. For the purpose of determining visual brightness of white objects, such as motion picture theater screens, a green filter is preferably used, the peak transmission of the filter being at the peak of the eye sensitivity to light, namely, middle green at 550 mmu. At the other end of the casing 5 is a transparent plate 15 mounted in a bushing 16 and having positioned thereon a comparison spot 17, preferably in the form of a white annular opaque ring. This spot may also have other shapes, such as a dot, a bar or bars, etc.

Within the casing 5, a source of current is provided by batteries, two being shown at 20, which are connected through a switch 21 having an actuating element 22 to a rheostat 24 having a hand knob 25. The remaining portion of the circuit includes a lamp 26 for illuminating the comparison spot 17 and a lamp 27 illuminating a photocell 28 connected by conductors 31 and 32 to a meter 30 which may be calibrated in foot lamberts. A calibrating resistor is shown at 33. Since the purpose of the photocell is to provide electrical energy to the meter 30 in proportion to the intensity of illumination of the comparison spot, the photocell could be positioned adjacent to and receive illumination from lamp 26. Both arrangements provide the same result.

The operation of the meter is as follows: The meter is pointed toward an object whose brightness is to be measured. The object is sighted through the eyepiece 10, the filter 13, and the window 15. The comparison spot 17 will appear as an opaque spot. Upon depressing the switch 21 and adjusting rheostat 24, the illumination on spot 17 from lamp 26 is adjusted until its brightness appears to equal that of the object being observed. When the spot 17 is of equal brightnes, it will apparently disappear from view.

Since lamp 27 is connected in series with lamp 26, the same current will pass through both lamps. While the light from each lamp may not be equal to the other, there exists a fixed relationship between the light output of the two lamps, lamp 27 illuminating the photocell 28 to provide a certain meter reading when lamp 26 is adjusted so that the comparison spot 17 disappears. Therefore, for any specific illumination of spot 17, there is also a specific current indicated by the meter 30, so that the meter can be calibrated in units of foot lamberts. A disadvantage of former comparison type of light meters is the difficulty of the observer to arrive at a decision regarding the point at which the brightness of the comparison spot appears to match the brightness of the object. This difficulty is caused by the fact that the color of the object and the color of the comparison spot are usually different. The use of filter 13 before the eyepiece overcomes this difficulty, the filter being selected so as to pass a narrow band or portion of the visible spectrum so that all objects, including the comparison spot, appear to be exactly the same color.

As mentioned above, it will be noted that the instrument contains no balancing circuits, thus requiring no balancing adjustment and no zero adjustment, and that a constant current or even a reference current is not required. Thus, regardless of the strength of the batteries, or variations in lamp output for a certain current, the same readings may be obtained as long as there is sufficient energy to cause the comparison spot to disappear.

Although the invention is shown in its preferred form, many variations thereof are possible. That is, as mentioned above, the photocell could be placed adjacent lamp 26, thereby eliminating lamp 27. Also, filter 13 is shown as a green filter because the green filter causes all brightness measurements to occur in terms of visual foot lamberts. However, red, blue, or infrared filters may be used where it is important to determine relative brightness in red or other units.

I claim:

1. A brightness meter comprising a casing having two optically aligned openings in the walls thereof to form a viewing path to an object whose brightness is to be measured, a transparent plate in one of said openings, a filter in said viewing path, a comparison spot in said viewing path between said openings, a photoelectric cell, a meter connected to said cell for indicating the output of said cell, means for illuminating said comparison spot, means for illuminating said photocell, a power source, means for varying the power from said source, said spot illuminating means, said photocell illuminating means, said power source, and said means for varying the power from said source being connected in series to provide a fixed relationship between the light output of said two illuminating means.

2. A brightness meter in accordance with claim 1 in which said filter is peaked in the neighborhood of 550 millimicrons and has a characteristic comparable to that of the eye sensitive curve.

3. A brightness meter in accordance with claim 1 in which said illuminating means are a pair of lamps, one illuminating said comparison spot and the other illuminating said photocell.

4. A brightness meter comprising means for forming an optical path, said path including a transparent plate with a comparison spot thereon and a filter for varying the color of the light viewed through said transparent plate, light measuring means including a photoelectric cell and meter combination, a power source, means for varying the power output from said source, and a pair of lamps connected in series with said power source and said means for varying the power output from said source, one of said lamps illuminating said transparent plate and said comparison spot and the other of said lamps illuminating said photoelectric cell, variation of the power from said power source varying the light output of said lamps in a fixed relationship.

References Cited in the file of this patent
UNITED STATES PATENTS

| | | |
|---|---|---|
| Re. 22,231 | Axtell | Dec. 8, 1942 |
| 1,731,134 | Hirschson | Oct. 8, 1929 |
| 1,938,544 | Schoenberg | Dec. 5, 1933 |
| 1,974,492 | Helfenstein | Sept. 25, 1934 |
| 2,172,634 | Axtell | Sept. 12, 1939 |